(12) United States Patent
Takeuchi et al.

(10) Patent No.: US 12,496,965 B2
(45) Date of Patent: Dec. 16, 2025

(54) PROJECTOR AND DESIGN FILTER FOR PROJECTOR PROJECTION

(71) Applicant: TOYODA GOSEI CO., LTD., Kiyosu (JP)

(72) Inventors: Masato Takeuchi, Kiyosu (JP); Yoichi Matsuoka, Kiyosu (JP); Shunya Nishimura, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 521 days.

(21) Appl. No.: 17/982,251

(22) Filed: Nov. 7, 2022

(65) Prior Publication Data
US 2023/0141871 A1    May 11, 2023

(30) Foreign Application Priority Data

Nov. 9, 2021  (JP) .................................. 2021-182478
Oct. 25, 2022 (JP) .................................. 2022-170483

(51) Int. Cl.
*B60Q 3/80*    (2017.01)

(52) U.S. Cl.
CPC ............ *B60Q 3/80* (2017.02); *B60K 2360/25* (2024.01)

(58) Field of Classification Search
CPC .............................. B60K 2360/25; B60Q 3/60
See application file for complete search history.

(56) References Cited

U.S. PATENT DOCUMENTS

| 9,500,334 B2 * | 11/2016 | Iwasaki ................ F21S 41/43 |
| 10,982,954 B2 | 4/2021 | Kwon et al. |
| 2019/0383601 A1 * | 12/2019 | Kwon ..................... G01B 11/22 |
| 2020/0041886 A1 * | 2/2020 | You .......................... G02B 27/42 |
| 2021/0199426 A1 | 7/2021 | Kwon et al. |
| 2022/0221123 A1 | 7/2022 | Okubo |

FOREIGN PATENT DOCUMENTS

| CN | 203069954 U | * | 7/2013 |
| EP | 3584634 A1 | | 12/2019 |
| JP | 2009-244042 A | | 10/2009 |
| JP | 2010-134228 A | | 6/2010 |
| JP | 2014-040194 A | | 3/2014 |
| JP | 2016134314 A | * | 7/2016 |
| JP | 2019-046769 A | | 3/2019 |
| JP | 2020-205237 A | | 12/2020 |

OTHER PUBLICATIONS

Office Action dated May 7, 2024 issued for the corresponding Japanese Patent Application No. 2021-182478 (and English translation).
Office Action dated Jul. 22, 2025 issued in corresponding Japanese patent application No. 2022-170483 (and English machine translation).

* cited by examiner

*Primary Examiner* — Paul C Lee
(74) *Attorney, Agent, or Firm* — Posz Law Group, PLC

(57) ABSTRACT

A projector includes a light source to emit light, a design plate including a design for projecting, a first lens part including a condenser lens to condense light emitted from the light source and sends to the design plate, and a second lens part including a projection lens to project the design of the design plate. The first lens part and the second lens part sandwich and fix the design plate to seal the design plate inside.

12 Claims, 13 Drawing Sheets

*FIG. 12A*      *FIG. 12B*      *FIG. 12C*
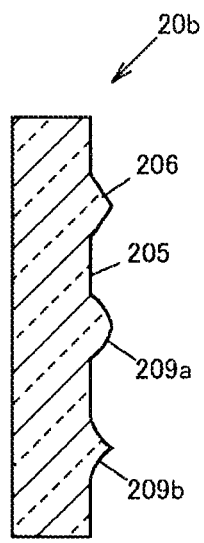
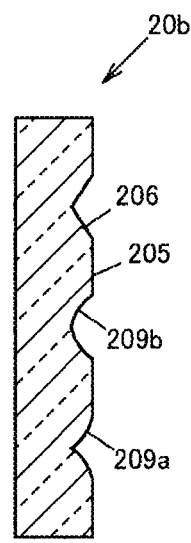
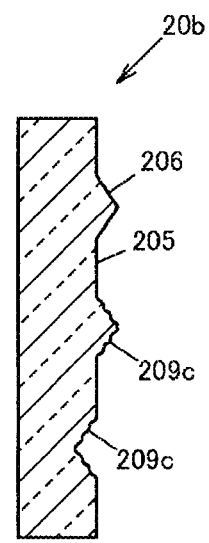

PROJECTOR AND DESIGN FILTER FOR PROJECTOR PROJECTION

CROSS-REFERENCES TO RELATED APPLICATIONS

The present patent application claims the priority of Japanese patent applications No. 2021/182478 filed on Nov. 9, 2021, and No. 2022/170483 filed on Oct. 25, 2022, and the entire contents of Japanese patent applications No. 2021/182478 and No. 2022/170483 are hereby incorporated by reference.

TECHNICAL FIELD

The present invention relates to a projector and a design filter and, in particular, to a projector and a design filter used in a vehicle interior.

BACKGROUND ART

A vehicle lamp is known that includes a condenser lens condensing light emitted from a light source, a blind member partially transmitting light condensed at the condenser lens, and a projection lens forming an irradiation pattern by projecting light transmitted at the blind member (see e.g., Patent Literature 1).

For the vehicle lamp described in Patent Literature 1, the condenser lens, a filter, and the projection lens are housed in a housing, and respectively fitted and fixed in a condenser lens groove, a filter groove, and a projection lens groove that are included in the housing. Also, in the vehicle lamp described in Patent Literature 1, an irradiation slit partially transmitting light condensed at the condenser lens is provided at a filter as the blind member to form the irradiation pattern.

Citation List

Patent Literature

Patent Literature 1: JP 2020/205237 A

SUMMARY OF INVENTION

However, in the vehicular lamp described in Patent Literature 1, since the positions of the condenser lens, the filter, and the projection lens are fixed by the housing, the relative positioning accuracy of the condenser lens, the filter, and the projection lens is low and, worse, the projected image may be blurred. Foreign matter such as dust may enter the space where the filter is installed from the outside through the gap between the condenser lens and the housing in the condenser lens groove and the gap between the projection lens and the housing in the projection lens groove. Therefore, the foreign matter may enter and be reflected in the projected image.

Also, in order to install the irradiation slit in the filter like the vehicle lamp described in Patent Literature 1, a complicated method of providing a light-blocking layer having a slit on a base material by printing, photolithography, or the like is generally used. Therefore, it becomes costly.

It is an object of the present invention to provide a projector that is capable of projecting a clear image in which reflection of foreign matter is suppressed.

It is another object of the present invention to provide a projector that can be manufactured at low cost to project a pattern in a vehicle interior, etc., and a pattern filter used in the projector that can be manufactured at low cost.

An aspect of the present invention provides a projector and a design filter as defined below.

(1) A projector, comprising:
 a light source to emit light;
 a design plate comprising a design for projecting;
 a first lens part comprising a condenser lens to condense light emitted from the light source and sends to the design plate; and
 a second lens part comprising a projection lens to project the design of the design plate,
 wherein the first lens part and the second lens part sandwich and fix the design plate to seal the design plate inside.

(2) The projector according to (1), wherein the design plate further comprises a transparent substrate and an opacifying film on the transparent substrate comprising a pattern to form the design, and
 wherein a minimum width of the opacifying film is less than 10 µm.

(3) The projector according to (1) or (2), wherein a fine part of which at least is partially included in the design of the design plate is not projected at a focused projection image, and
 wherein a brightness between a brightness at a part formed by a light transmitting part of the design and a brightness at a part formed by a light blocking part of the design in the projection image is described by the fine part.

(4) A projector, comprising
 a light source to emit light;
 a design filter comprising a transparent material comprising a design for projecting; and
 a projection lens to magnify and project the design of the design filter,
 wherein the design filter comprises a design formed surface, and
 wherein the design formed surface comprises a first surface having an angle of not less than 75° and not more than 105° to a thickness direction of the design filter, and a second surface having an angle of not less than 30° and not more than 60° to the thickness direction of the design filter, the first and second surfaces being arranged corresponding to the design.

(5) The projector according to (4), wherein the design formed surface of the design filter comprises a base plane comprising the first surface and at least one of a protrusion comprising the two second surfaces opposed to each other and a cavity comprising the two second surfaces opposed to each other.

(6) The projector according to (4) or (5), wherein the design filter is plate-shaped and further comprises the design formed surfaces on both surfaces thereof.

(7) The projector according to (4) or (5), wherein the design filter comprises a lens part serving as a condenser lens to condense light emitted from the light source on an opposite side of the design formed surface.

(8) A design filter, comprising:
 a plate-shaped transparent material comprising a design for projector projection; and
 a design formed surface at both surfaces thereof,
 wherein the design formed surface comprises a first surface having an angle of not less than 75° and not more than 105° to a thickness direction of the design filter, and a second surface having an angle of not less than 30° and not more than 60° to the thickness direction of the design filter, the first and second surfaces being arranged corresponding to the design.

(9) A design filter, comprising:
a transparent material comprising a design for projector projection;
a design formed surface; and
a lens part serving as a condenser lens to condense light emitted from a light source of a projector on an opposite side of the design formed surface,
wherein the design formed surface comprises a first surface having an angle of not less than 75° and not more than 105° to a thickness direction of the design filter, and a second surface having an angle of not less than 30° and not more than 60° to the thickness direction of the design filter, the first and second surfaces being arranged corresponding to the design.

Advantageous Effects of Invention

According to an embodiment of the present invention, it is possible to provide a projector that is capable of projecting a clear image in which reflection of foreign matter is suppressed.

Also, according to an embodiment of the present invention, it is possible to provide a projector that can be manufactured at low cost to project a pattern in a vehicle interior, etc., and a pattern filter used in the projector that can be manufactured at low cost.

BRIEF DESCRIPTION OF DRAWINGS

FIGS. 12A to 12C are cross-sectional views showing variations of the design plate according to the embodiment of the present invention.

DESCRIPTION OF EMBODIMENTS

Embodiments

Figure 1A:
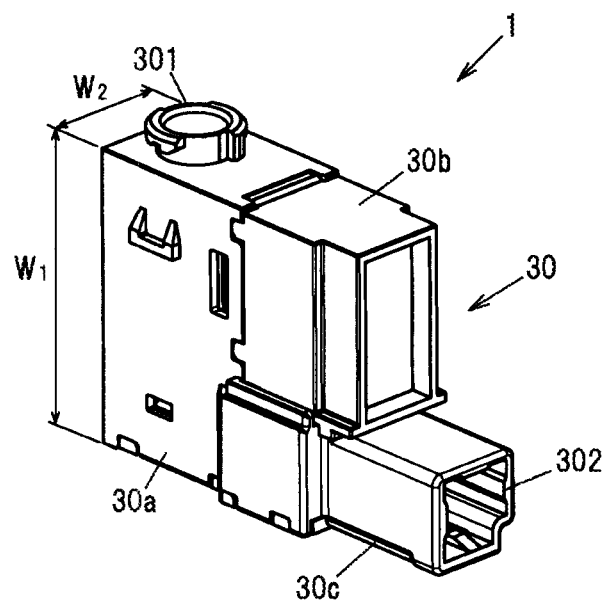
FIGS. 1A and 1B are perspective views respectively showing a projector according to the embodiment of the present invention, which are viewed from different angles.
Figure 1B:
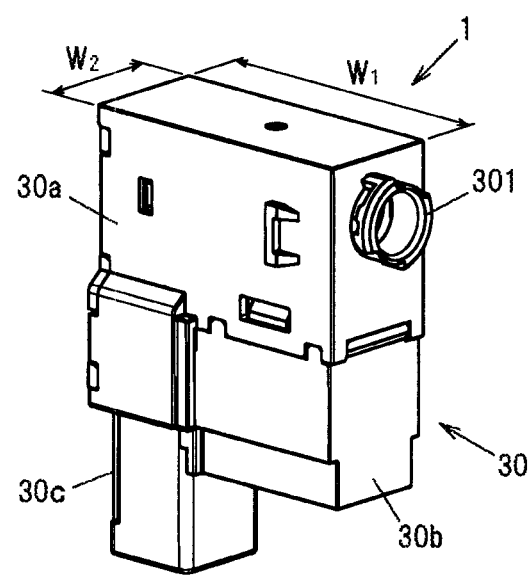
Figure 2A:
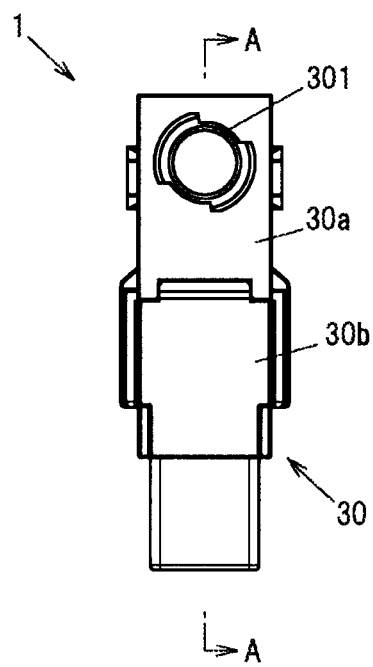
FIG. 2A is a side view showing the projector according to the embodiment of the present invention viewed from a light extracting side.
Figure 2B:
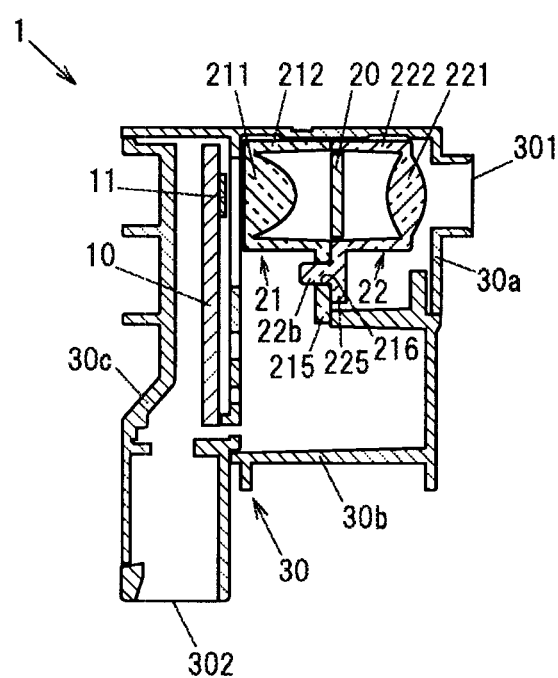
FIG. 2B is a cross-sectional view showing the projector cut along a line A-A shown in FIG. 2A.
Figure 3:
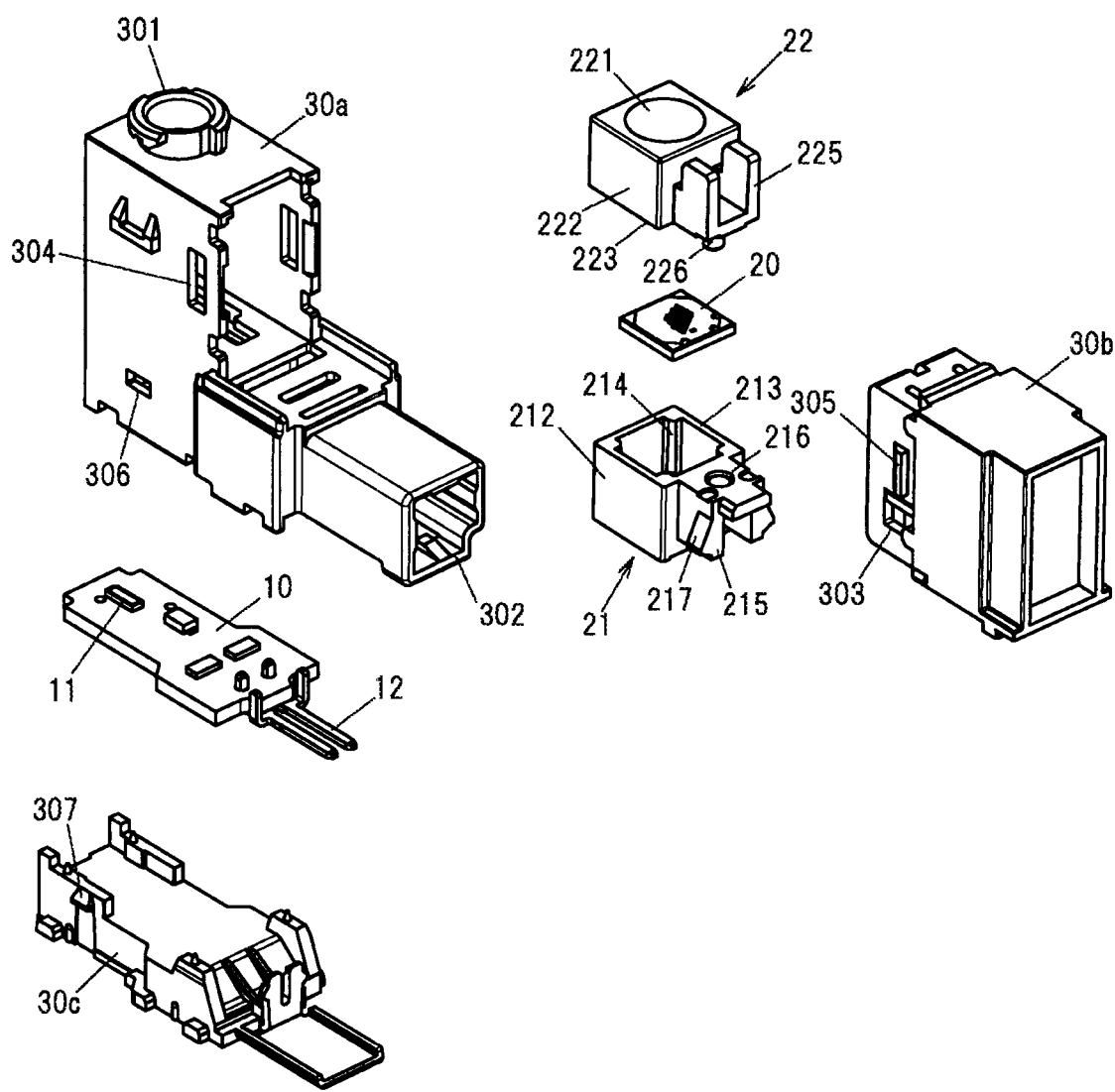
FIG. 3 is an exploded perspective view showing the projector according to the embodiment of the present invention.

FIGS. 1A and 1B are perspective views respectively showing a projector 1 according to the embodiment of the present invention, which are viewed from different angles. FIG. 2A is a side view showing the projector 1 according to the embodiment of the present invention viewed from a light extracting side. FIG. 2B is a cross-sectional view showing the projector 1 cut along the line A-A shown in FIG. 2A. FIG. 3 is an exploded perspective view showing the projector 1.

The projector 1 is mainly used in a vehicle interior. For example, the projector 1 is attached to a side panel of vehicle compartment, an instrument panel, or a door. The projector 1 projects an image on a door, a floor mattress, a roof, and a decorated panel or a decorated ornament included in the instrument panel or a door trim.

The projector 1 includes a light source 11 emitting light, a design plate 20 having a design for projecting, a first lens part 21 comprising a condenser lens 211 condensing light emitted from the light source 11 and sending to the design plate 20, and a second lens part 22 comprising a projection lens 221 to project expanding the design of the design plate 20. In the projector 1, the first lens part 21 and the second lens part 22 sandwich and fix the design plate 20 to seal the design plate 20 inside the first lens part 21 and the second lens part 22.

The light source 11 is a light emitting element comprising a light emitting diode (LED) chips and so on. The light source 11 is mounted on a circuit board 10. A connector 12 to transmit power and signal to the light source 11 is connected to the circuit board 10.

The circuit board 10 mounting the light source 11, the first lens part 21, the second lens part 22, and the design plate 20 are housed in a body 30 comprising parts 30a, 30b, 30c. The body 30 includes an opening 301 to extract light from the projection lens 221 and an opening 302 to connect a connector of an external device to the connector 12. The body 30 is formed of resins such as Polybutylene terephthalate (PBT) resin, Polypropylene (PP) resin, and Acrylonitrile-Butadiene-Styrene (ABS) resin.

The part 30a and the part 30b are fixed by snap-fitting protrusions 305 provided at both side surfaces of the part 30b to holes 304 provided on the part 30a. In addition, the part 30a and the part 30c are fixed by snap-fitting protrusions 307 provided at both side surfaces of the part 30c to holes 306 provided on the part 30a. The circuit board 10 is fixed by sandwiched between the part 30a and the part 30c.

The first lens part 21 includes the condenser lens 211, a frame part 212 having a box-shape (e.g., rectangular) having one opening in one surface, and a fixing part 215 to fix the first lens part 21 to the second lens part 22 and the body part 30b. The condenser lens 211 is located in a surface facing the opening surface of the frame part 212. The first lens part 21 is formed of resins such as Polycarbonate (PC) resin and Polymethyl methacrylate (PMMA) resin.

The second lens part 22 includes the projection lens 221, a frame part 222 having a box-shape (e.g., rectangular) having one opening in one surface, and a fixing part 225 to fix the second lens part 21 to the first lens part 21 and the body part 30b. The projection lens 221 is located in a surface facing the opening surface of the frame part 222. The second lens part 22 is formed of resins such as Polycarbonate resin and Polymethyl methacrylate resin.

In the projector 1, the first lens part 21 and the second lens part 22 are fixed to facing the opening surface of the frame part 212 and the opening surface of the frame part 222 and wholly adhere an end surface 213 that is an edge of the opening surface of the frame part 212 and an end surface 223 that is an edge of the opening surface of the frame part 222. Hereby, a space inside the first lens part 21 and the second lens part 22 including the design plate 20 is sealed. In addition, it is preferable to treat polishing the end surface 213 and the end surface 223 to increase sealing.

When adhering the first lens part 21 and the second lens part 22, a portion 214 extended inside from four corners of interior of the frame part 212 and a portion 224 extended inside from four corners of interior of the frame part 222 fixes four corners of the design plate 20 with sandwiching from front and back.

FIGS. 4A to 4D are perspective views showing a flow of attaching the first lens part 21, the design plate 20, and the second lens part 22 to the part 30b of the body 30.

Figure 4A:
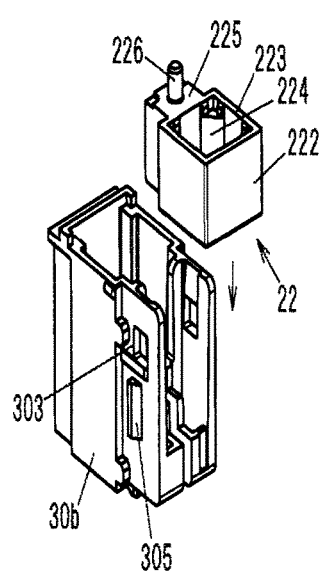
FIGS. 4A to 4D are perspective views showing a flow of attaching a first lens part, a design plate, and a second lens part to a body parts.
Figure 4B:
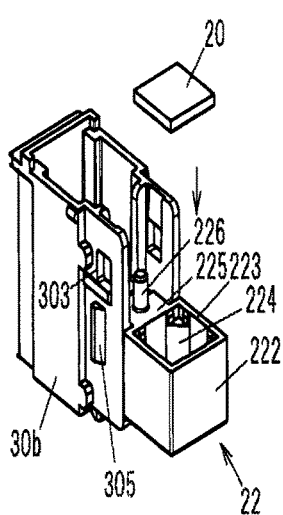

First, as shown in FIGS. 4A, 4B, the second lens part 22 is attached to the part 30b of the body 30. The fixing part 225 is fit in the part 30b of the body 30 with facing the opening surface of the frame part 222 upward.

Figure 4C:
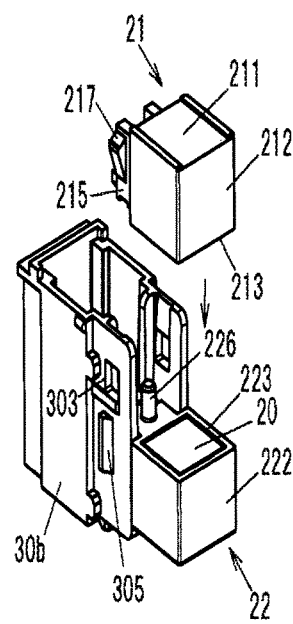

Next, as shown in FIGS. 4B, 4C, the design plate 20 is fit into the opening surface of the frame part 222 of the second lens part 22. The design plate 20 is fit into the opening surface of the frame part 222 to ride the design plate 20 on a portion 224 in the frame part 222 of the second lens part 22.

Figure 4D:
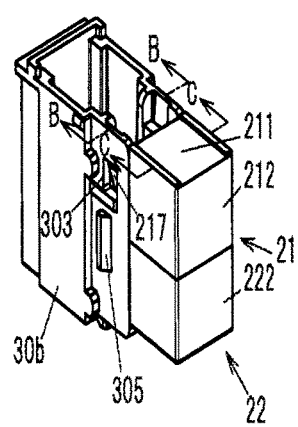

Next, as shown in FIGS. 4C, 4D, the first lens part 21 is attached to the body part 30b. The fixing part 215 is fit into the part 30b of the body 30 to face the opening surface of the frame part 212 downward. Herein, a protrusion 226 provided at the fixing part 225 of the second lens part 22 is fit into the hole 216 provided at the fixing part 215 of the first lens part 21. In addition, when the fixing part 215 is fit in the part 30b, protrusions 217 provided at both side surfaces of the fixing part 215 are snap-fit into holes 303 provided at the part 30b.

Figure 5A:
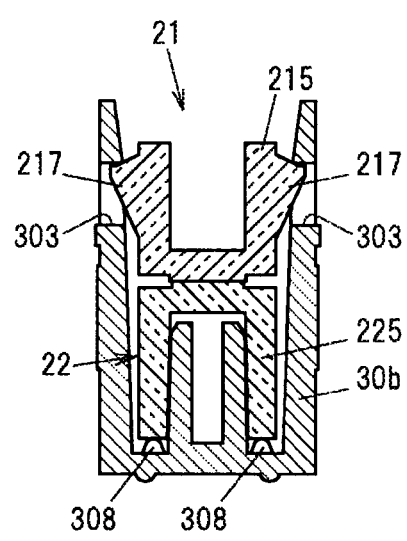
FIG. 5A is a cross-sectional view showing the body parts, the first lens part, and the second lens part cut along a line B-B shown in FIG. 4D.

FIG. 5A is the cross-sectional view showing the part 30b of body 30, the first lens part 21, and the second lens part 22 cut along the line B-B shown in FIG. 4D.

As shown in FIG. 5A, since the second lens part 22 crushes upward and elastically deforms projections 308 provided at a bottom surface inside the part 30b, the second lens part 22 receives upward resilience from the projections 308. In the meantime, since upward movement of the first lens part 21 and the second lens part 22 is prevented by hooking the projections 217 of the first lens part 21 to the hole 303, the first lens part 21 and the second lens part 22 are fixed to the part 30b.

Figure 5B:
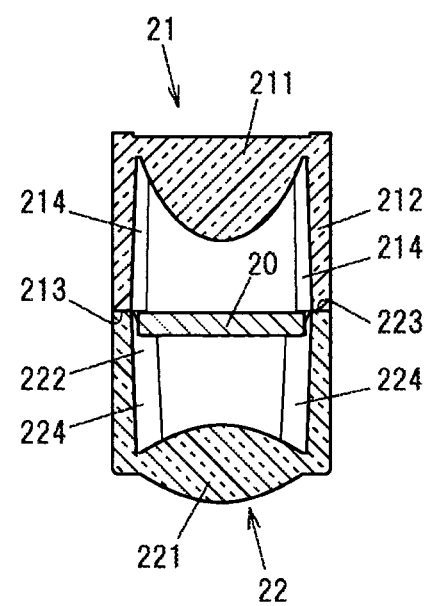
FIG. 5B is the cross-sectional view showing the first lens part 21, and the second lens part 22, and the design plate 20 cut along a line C-C shown in FIG. 4D.

FIG. 5B is the cross-sectional view showing the first lens part 21, and the second lens part 22, and the design plate 20 cut along the line C-C shown in FIG. 4D.

As shown in FIG. 5B, the first lens part 21 and the second lens part 22 are fixed with adhering the end surface 213 that is the edge of the opening surface of the frame part 212 and the end surface 223 that is the edge of the opening surface of the frame part 222. And thus, the space inside the first lens part 21 and the second lens part 22 is sealed. In addition, the design plate 20 is fixed by sandwiched with the portion 214 extended inside from the four corners of interior of the frame part 212 and the portion 224 extended inside from the four corners of interior of the frame part 222.

In the projector 1, since the first lens part 21, the second lens part 22, and the design plate 20 are fixed with adhering each other, relative positioning accuracy of the condenser lens 211 included in the first lens part 21, the projection lens 221 included in the second lens part 22, and the design plate 20 becomes high. Thus, it is possible to control blurring projection image caused by relational shift of the condenser lens 211, the projection lens 221, and the design plate 20.

In addition, since the space inside the first lens part 21 and the second lens part 22 is sealed, it is possible to control entering foreign bodies such as dust around the design plate 20. Thus, it is possible to control reflecting the foreign body to the projection image.

In the meantime, a method to fix the first lens part 21, the second lens part 22, and the design plate 20 with adhering each other is not limited to the method using snap-fitting with the part 30b described above. For example, the first lens part 21 and the second lens part 22 may be fixed by adhesive bond.

Figure 6:
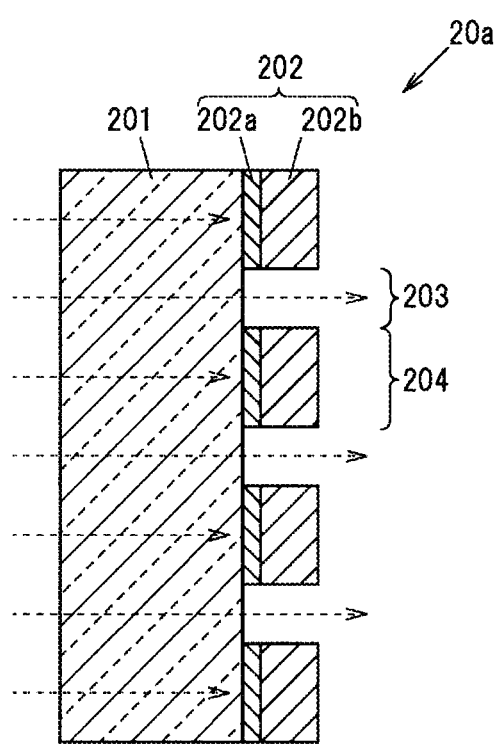
FIG. 6 is a longitudinal cross-sectional view showing an embodiment of design plate according to the embodiment of the present invention.

FIG. 6 is a longitudinal cross-sectional view showing a design plate 20a that is an embodiment of the design plate 20. The design plate 20a includes a transparent substrate 201 transmitting light from the light source 11 and an opacifying film 202 that does not transmit the light from the light source 11. The opacifying film 202 has a predetermined opening pattern constituting a design of the design plate 20a, and includes a light transmitting part 203 that is an opening and a light blocking part 204 that is not an opening part.

A projection image by the projector 1 includes a high brightness region having a pattern corresponding to the pattern of the light transmitting part 203 and a low brightness region having a pattern corresponding to the pattern of the light blocking part 204.

To forming a fine opening pattern on the opacifying film 202 and making the design in the design plate 20a fine, it is preferable to form a pattern on the opacifying film 202 formed of metal filmed on the transparent substrate 201 formed of glass by metal etching. By filming metal film using deposit, it is possible to obtain the opacifying film 202 having very thin (approximately 100 nm) film and forming pattern by etching.

In this case, the opacifying film 202 consists of laminated film, e.g., comprising an opacifying film 202a formed of CrO and an opacifying film 202b formed of Cr. In addition, for example, thickness of the opacifying film 202, the opacifying film 202a, and the opacifying film 202b are respectively 1.1 mm, 8 nm, and 62 nm. A plane size of the design plate 20 is 8 mm×8 mm.

When forming a pattern on the opacifying film 202 formed of metal filmed on the transparent substrate 201 formed of glass, it is possible to set a minimum width of the opacifying film 202 forming the pattern (a minimum width of the light blocking part 204 forming the light transmitting parts 203 at both sides of the light blocking part 204) at not less than 1 µm, less than 10 µm, in more detail, not less than 1 µm and not more than 5 µm.

In addition, when the design of the design plate 20a includes a fine part that exceeds resolution of the projection lens 221, the fine part is not projected in a focused projection image. Specifically, it is impossible to visualize a border between a high brightness region formed by the light transmitting part 203 and a low brightness region formed by the light blocking part 203 in the projection image. The high brightness region and the low brightness region are mixed. And thus, a region having a brightness between these brightness (lower than the high brightness imaged region and higher than the low brightness imaged region) is visualized.

That is, it is possible to describe a brightness between the brightness at a part formed by the light transmitting part 203 and the brightness at a part formed by the light blocking part 204 in the projection image by using a fine part that does not imaged by the focused projection image included in the design of the design plate 20a.

Figure 7A:
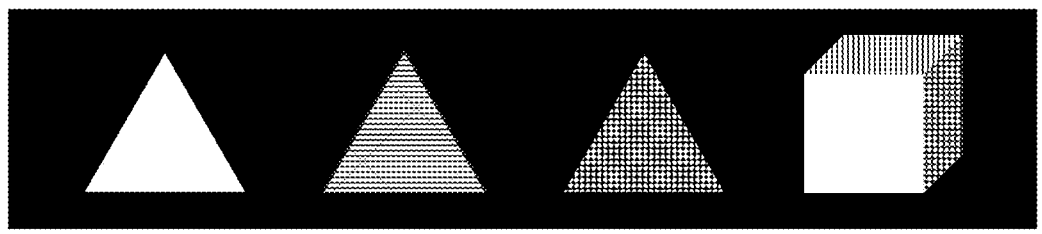
FIG. 7A is a schematic view showing an example of design on the design plate according to the embodiment of the present invention.
Figure 7B:
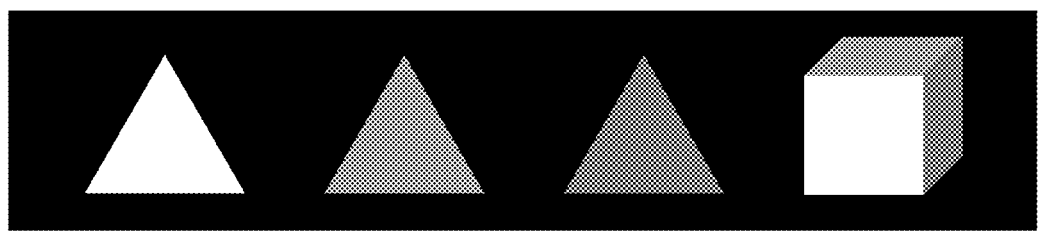
FIG. 7B is a schematic view showing a projection image projecting the design of FIG. 7A.

FIG. 7A is a schematic view showing an example of design on the design plate 20a. FIG. 7B is a schematic view showing a projection image projecting the design of FIG. 7A. A line-and-space pattern (second triangle from left and upper surface of cube) included in the design of FIG. 7A and a dot pattern (third triangle from left and side surface of the cube) are fine patterns that exceed resolution of the projection lens 221. In the projection image shown in FIG. 7B, the region formed by these fine patterns is visualized as a gray region having a brightness between white of the region formed by the light transmitting part 203 (first triangle from left and front surface of the cube) and black of the region formed by the light blocking part 204 (base part). Thus, it is possible to present gradation shown by difference between brightness of three triangles in FIG. 7B or three-dimensional shape expressed by the cube of FIG. 7B.

In addition, it is possible to minimize the design plate 20 if forming fine pattern on the opacifying film 202. Since size of the projection image multiplies design size of the design plate 20 by magnification of optical system, it is possible to increase magnification with maintaining size of the projection image if the design plate 20 can be minimized. Hereby, it is possible to minimize the projector 1 by shortening distance between the design plate 20 and the projection lens 221 (increasing magnification). That is, it is possible to minimize the projection 1 with maintaining size of the projection image by minimizing the design plate 20. For example, width $W_1$ in an optic axis direction of the projector 1 can be set at not more than 35 mm, and width $W_2$ in a direction perpendicular to the optic axis direction can be set at not more than 13 mm, and angle of view can be set at not less than 20°.

Figure 8:
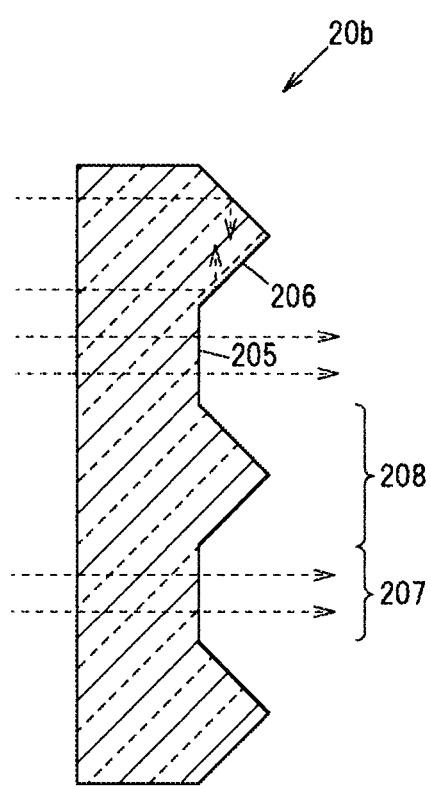
FIG. 8 is a longitudinal cross-sectional view showing another embodiment of design plate according to the embodiment of the present invention.

FIG. 8 is a longitudinal cross-sectional view showing a design plate 20b that is another embodiment of the design plate 20. The design plate 20b is formed of a transparent resin transmitting light from the light source 11. The design plate 20b includes a light transmitting part 207 constituting a plane 205 and a light blocking part 208 constituting an inclined surface 206 inclined to a plane on the plane.

The light blocking part 208 blocks light from the light source 11 by using total reflection at the inclined surface 206. Thus, an inclination angle of the inclined surface 206 is set at an angle such that light entering perpendicular to the design plate 20b totally reflects. Therefore, the light blocking part 208 comprising the inclined surface 206 does not transmit light. For example, when the design plate 20b is formed of polycarbonate (reflective index is 1.6), light totally reflects as the incident angle is not less than 38.7°, and when the design plate 20b is formed of Polymethyl methacrylate (reflective index is 1.5), light totally reflects as the incident angle is not less than 41.8°.

The projection image by the projector 1 includes a high brightness region having a pattern corresponding to the pattern of the light transmitting part 207 and a low brightness region having a pattern corresponding to the pattern of the light transmitting part 208.

The design plate 20b is formed by microfabricating to a plate molded article and so on. Thus, it is possible to form the design plate 20b cheaply compared with design plates such as the design plate 20a that is necessary to perform complex processes such as metal film deposition, forming resist pattern by photolithography, and etching.

Protrusion formed from the inclined surfaces 206 is provided at the light blocking part 208. For example, the protrusion formed from the inclined surfaces 206 is a linear protrusion that has a triangle-shaped cross-section formed by two inclined surfaces 206 opposed to each other, or a pyramid protrusion formed from not less than three inclined surfaces 206. In the meantime, when height of protrusion is limited (e.g., not more than 30 μm) caused by transcription in molding the design plate 20b etc., multiple protrusions having low height may be continuously aligned to ensure an area of the light blocking part 208.

Figure 9:
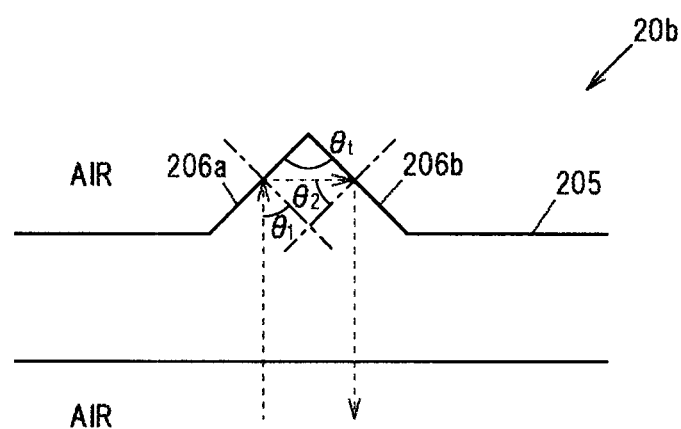
FIG. 9 is a schematic view explaining a condition causing total reflection when a light blocking part of the design plate includes projection including two inclined surfaces opposed to each other.

FIG. 9 is a schematic view explaining a condition causing total reflection when the light blocking part 208 of the design plate 20b includes a protrusion including two inclined surfaces 206 opposed to each other (e.g., the linear protrusion that has a triangle-shaped cross-section formed by the two inclined surfaces 206 opposed to each other, or a quadrangular pyramid protrusion). Herein, an incident angle to the inclined surface 206 (hereinafter it is referred to as the inclined surface 206a) where light firstly entering perpendicular to the design plate 20b is defined as $\theta_1$, and an incident angle to the inclined surface 206 (hereinafter it is referred to as the inclined surface 206b) where light reflected at the inclined surface 206a entering next is defined as $\theta_t$.

To totally reflect light entering perpendicular to the design plate 20b at the inclined surface 206a, $\theta_1$ is necessary to be set at not less than 38.7° when the design plate 20b is formed of polycarbonate. In such case, $\theta_t$ is set at not more than 102.6°. $\theta_1$ is necessary to be set at not less than 41.8° when the design plate 20b is formed of Polymethyl methacrylate. In such case, $\theta_t$ is set at not more than 96.4°.

In addition, to totally reflect the totally reflected light at the inclined surface 206a at the inclined surface 206b, $\theta_2$ is necessary to be set at not less than 38.7° when the design plate 20b is formed of polycarbonate. In such case, $\theta_t$ is set at not less than 85.8°. $\theta_2$ is necessary to be set at not less than 41.8° when the design plate 20b is formed of Polymethyl methacrylate. In such case, $\theta_t$ is set at not less than 87.9°.

Thus, when the design plate 20b is formed of polycarbonate, to block light at the light blocking part 208 effectively, it is preferable to set cross-sectional angle $\theta_t$ of apex of the protrusion at not less than 85.5° and not more than 102.6°. In addition, when the design plate 20b is formed of Polymethyl methacrylate, to block light at the light blocking part 208 effectively, it is preferable to set cross-sectional angle $\theta_t$ of apex of the protrusion at not less than 87.9° and not more than 96.4°.

Figure 10A:
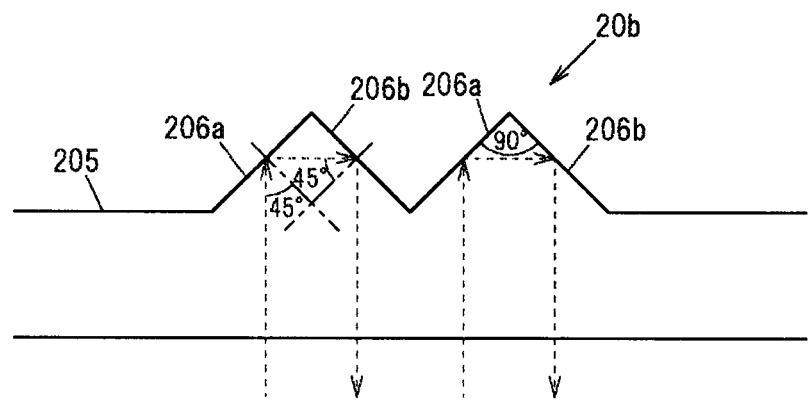
FIGS. 10A to 10C are schematic views showing an optical path of light entering into the design plate of which angle $\theta_t$ are 90°, 140° and 40°, respectively.

FIG. 10A is a schematic view showing an optical path of light entering into the design plate 20b of which angle $\theta_t$ is 90°. In this case, light entering perpendicular to the design plate 20b enters into the inclined surface 206a at the incident angle of 45° and is totally reflected. And then, the light enters into the inclined surface 206b at the incident angle of 45° and is totally reflected, and returns to a light source 11 side. Since the protrusion having the angle $\theta_t$ of 90° can be defined by general tool, the special preferable value of the angle $\theta_t$ is 90°.

Figure 10B:
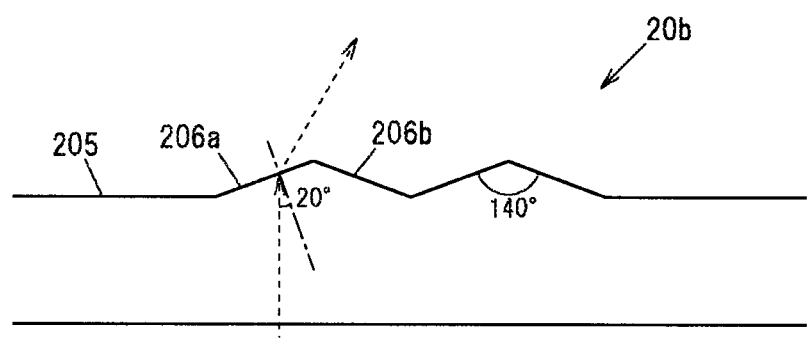

FIG. 10B is a schematic view showing an optical path of light entering into the design plate 20b of which angle $\theta_t$ is 140°. In this case, light entering perpendicular to the design plate 20b enters into the inclined surface 206a at the incident angle of 20°. And then, the light reflects at the inclined surface 206b partially transmits the design plate 20b.

Figure 10C:
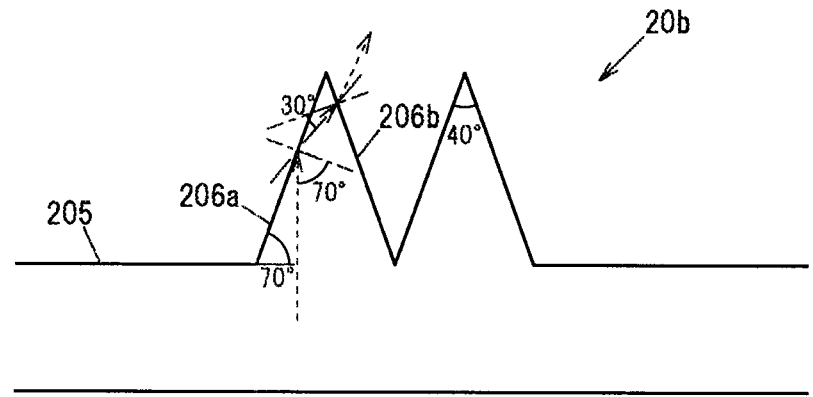

FIG. 10C is a schematic view showing an optical path of light entering into the design plate 20b of which angle $\theta_t$ is 40°. In this case, light entering perpendicular to the design plate 20b enters into the inclined surface 206a at the incident angle of 70° and is totally reflected. However, the light reflects then enters into the inclined surface 206b at the incident angle of 30° and partially reflects at the inclined surface 206b and transmits the design plate 20b.

FIGS. 11A to 11E are cross-sectional views respectively showing the design plate 20b showing an arrangement examples of the inclined surface 206.

Figure 11A:
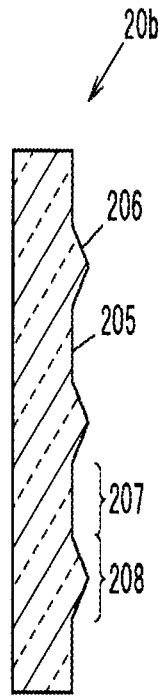
FIGS. 11A to 11E are cross-sectional views respectively showing arrangement examples of the inclined surface.

The design plate 20b shown in FIG. 11A includes a protrusion including the inclined surfaces 206 at one side surface. As described above, the protrusion is preferable to be a protrusion including two inclined surfaces 206 opposed to each other (e.g., the linear projection having a triangle-shaped cross-section formed by the two inclined surfaces 206 opposed to each other, or a quadrangular pyramid protrusion formed by four inclined surfaces 206).

Figure 11B:
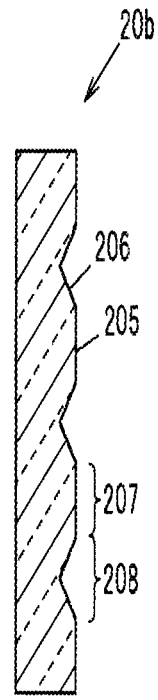

The design plate 20b shown in FIG. 11B includes a cavity including the inclined surfaces 206 at one side surface. As with the protrusion, the cavity is preferable to be a cavity including two inclined surfaces 206 opposed to each other (e.g., the linear cavity having a triangle-shaped cross-section formed by the two inclined surfaces 206 opposed to each other, or a quadrangular pyramid cavity formed by four inclined surfaces 206).

Figure 11C:
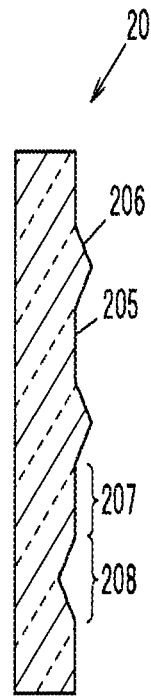

The design plate 20b shown in FIG. 11C includes a protrusion and a cavity including the inclined surface 206 at one side surface. Since transcription of the protrusion in molding is worse than that of the cavity, a curvature R is easily formed at a tip end of the protrusion. Since light is hard to reflect at the R part, the design plate 20b is preferable to have only the cavity as shown in FIG. 11B to reduce forming the R as possible.

One side surface of the design plate 20b shown in FIGS. 11A to 11C is a surface for forming the design comprising the plane 205 and the inclined surface 206 (hereinafter, it is referred to as a design formed surface). The design plate 20b may be attached to the projector 1 with facing the design formed surface to a condenser lens 211 side or a projection lens 221 side.

Figure 11D:
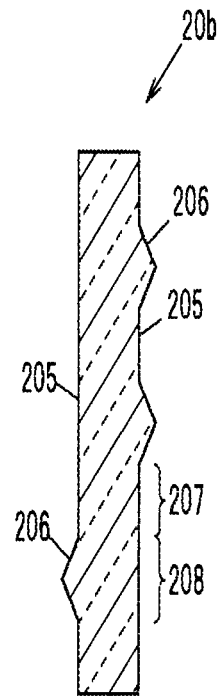

The design plate 20b shown in FIG. 11D includes protrusions including the inclined surface 206 at both surfaces. In addition, the design plate 20b may include cavities at both surfaces instead of the protrusions.

Figure 11E:
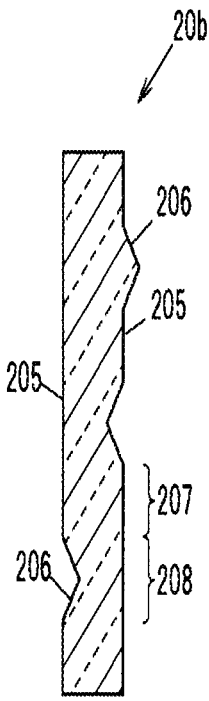

The design plate 20b shown in FIG. 11E includes a protrusion or a cavity at both surfaces and includes both the protrusion and the cavity at least one of the surfaces.

Both surfaces of the design plate 20b shown in FIGS. 11D, 11E are the design formed surface. In this case, a region where the inclined surface 206 at least one side surface from a region of the design plate 20b in a plane direction exists is the light blocking part 208 and a region where the plane 205 exists at both surfaces is the light transmitting part 207.

As shown in FIGS. 11D, 11E, when both surfaces of the design plate 20b are defined as the design formed surface, since image formation position by design imaged by one side surface is different from that by design imaged by another side surface, it is possible to broaden description by using the difference of image formation positions. For example, one side surface design can be clearly imaged to a projection surface and another side surface design can be blurry imaged. In the meantime, as shown in FIGS. 11A to 11C, it is preferable to set one side surface as the design formed surface to project whole of design clearly.

In the meantime, in the plane 205 constituting the light transmitting part 207, although an angle to the optic axis is preferable to be set at 90° to further transmit light, it is not limited thereto. The plane 205 may be formed to set the angle that can prevent reflecting light entering perpendicular to the design plate 20b and effectively transmit the light. For example, the angle to the optic axis may be set at not less than 75° and not more than 105°. In addition, as described above, the inclined surface 206 is preferable to be formed to prevent transmitting the light entering perpendicular to the design plate 20b by total reflection at the inclined surface 206 defining protrusion or cavity. However, it is not limited thereto. The inclined surface 206 may be formed to set the angle that effectively reflects light entering perpendicular to the design plate 20b at the inclined surface 206 defining the protrusion or cavity and thus can prevent transmitting effectively. For example, the inclined surface 206 is formed to set the angle to the optic axis at not less than 30° and not more than 60°. Further, it is not necessary to set the plane 205 and the inclined surface 206 to have constant angles. The angles may be different depending on the positions on the design formed surface. Since the design plate 20b is normally arranged such that a thickness direction thereof is parallel to the optic axis, the above angles to the optic axis can be translated into angles to the thickness direction of the design plate 20b.

FIGS. 12A to 12C are cross-sectional views showing variations of the design plate 20b. As shown in FIGS. 12A to 12C, the design plate 20 may include an inclined surface including a curved surface instead of the inclined surface 206 formed of the flat planes. The inclined surface 209a shown in FIGS. 12A, 12B is an inclined surface formed of a curved surface curved outside of the design plate 20b. The inclined surface 209b is an inclined surface formed of a curved surface curved inside of the design plate 20b. In addition, the embodiment of the curved surface as the inclined surface is not limited thereto. For example, as with the curved surface included in the inclined surface 209c shown in FIG. 12C, the cross-section may be a wavy curved surface.

In the inclined surface including the curved surfaces such as the inclined surfaces 209a, 209b, 209c, a region where an angle of the curved surface to the optic axis (the thickness direction of the design plate 20b) is not less than 75° and not more than 105° can be used as the light transmitting part 207 and a region where an angle of the curved surface to the optic axis is not less than 30° and not more than 60° can be used as the light blocking part 208. In addition, a region where an angle of the curved surface to the optic axis is between 60° and 75° can be used as a region for expressing an intermediate brightness between brightness caused by the light transmitting part 207 and brightness caused by the light blocking part 208 in the projection image by the projector 1. In addition, since the angle to the optic angle changes continuously in the curved surface, it is possible to express the gradation that the brightness in the projection image continuously changes. In addition, as with the inclined surface 206, a surface formed of a curved surface may be used in place of the plane 205. In this case, the embodiment of the curved surface is also not particularly limited. A region where an angle of the curved surface to the optic axis (the thickness direction of the design plate 20b) is not less than 75° and not more than 105° can be used as the light transmitting part 207, and a region where an angle of the curved surface to the optic axis is not less than 30° and not more than 60° can be used as the light blocking part 208. Obviously, the curved surface in place of the plane 205 has a higher rate of region served as the light transmitting part 207 than the curved surface in place of the inclined surface 206.

The design plate 20b includes plural embodiments as described above. For example, the design plate 20b can be defined as follows.

(1) A design filter, comprising:
   a plate-shaped transparent material;
   a design for projector projection; and
   a design formed surface on at least one surface of the design filer,
   wherein the design formed surface comprises a first surface having an angle of not less than 75° and not more than 105° to a thickness direction of the design filter to transmit light, and a second surface having an angle of not less than 30° and not more than 60° to the thickness direction of the design filter to block light, the first and second surfaces being arranged corresponding to the design.
(2) The design according to (1), wherein the design formed surface of the design filter comprises a base plane comprising the first surface and at least one of a protrusion comprising the two second surfaces opposed to each other and a cavity comprising the two second surfaces opposed to each other.

In examples of the design plate 20b shown in FIGS. 11A to 11E, the plane 205 and the inclined surface 206 correspond to the first surface and the second surface, respectively, mentioned in (1) and (2) above. Also, the inclined surface comprising curved surfaces such as the inclined surfaces 209a to 209c shown in FIGS. 12A to 12C may include the first surface and the second surface mentioned in (1), (2) above depending on the shape of the curved surface.

The design plate 20b is a kind of design filter having a design for projecting, and is plate-shaped. However, it is possible to use a design filter having a different shape than the plate-shaped design plate 20b for the projection 1.

Figure 13:
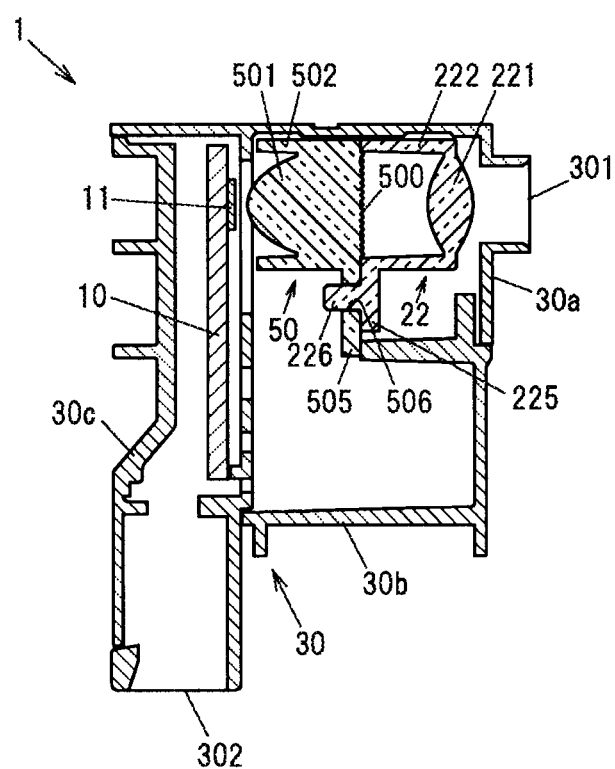
FIG. 13 is a cross-sectional view showing a projector comprising a design filter according to another embodiment.

FIG. 13 is a cross-sectional view showing the projector 1 comprising a design filter 50 that is a design filter according to the other embodiment. The cross-sectional position in FIG. 13 corresponds to the cross-sectional position in FIG. 2B.

As with the design plate 20b, the design filter 50 is formed of transparent material having design for projector projection. The design filter 50 includes a condenser lens.

The design filter 50 includes a structure that integrates a design plate comprising a design formed surface at one side surface as with the design plate 20b shown in FIGS. 11A to 11C and the condenser lens. The design filter 50 includes a design formed surface 500 and a condenser lens part 501 serving as a condenser lens arranged at an opposite side of the design formed surface 500 to condense light emitted from the light source 11.

The design formed surface 500 is similar to the design formed surface of the design plate 20b. For example, the design formed surface 500 is a surface that a first surface such as the plane 205 having an angle of not less than 75° and not more than 105° to the thickness direction (i.e., a direction perpendicular to the flat surface of the design formed surface 500) of the design filter 50 to transmit light, and a second surface such as the inclined plane 206 having an angle of not less than 30° and not more than 60° to the thickness direction to block light are arranged corresponding to the design.

For the design filter 50, since the design formed surface 500 and the condenser lens part 501 are included in one part, the projection image does not blur caused by relative shift between the design formed surface 500 and the condenser lens part 501.

The design filter 50 is attached to the projector 1 to face the design formed surface 500 to a projection lens 221 side and face the condenser lens part 501 to a light source 11 side. The condenser lens part 501 is curved to protrude toward the light source 11.

The design filter 50 is used instead of the design plate 20 and the first lens part 21 of the structure including the design plate 20 shown in FIG. 1B and so on. As shown in FIG. 13, the design filter 50 includes a frame part 502, a fixing portion 505, a hole 506 that have similar function with the frame part 212, the fixing part 215, and the hole 216 of the first lens part 21.

In addition, the design filter 50 and the second lens part 22 are fixed with sealing a tip end surface that is an edge around the design formed surface 500 of the design filter 50 and an end surface 223 that is an edge of opening surface of the frame part 222, and thus a space including the design formed surface 500 inside the design filter 50 and the second lens part 22 is sealed. Thus, it is possible to control entering foreign objects such as dust around the design formed surface 500. Therefore, it is possible to control reflecting foreign objects to projection image.

The design filter 50 is also formed by microfabricating to transparent materials such as resin mold as with the design plate 20b. Thus, it is possible to form the design filter cheaply compared with a design plate that is necessary to perform complex processes such as metal film deposition, forming resist pattern by photolithography, and etching.

Material of the design filter formed by microfabricating transparent materials such as the design plate 20b and the design filter 50 may be a material having a character transmitting light emitted from the light source 11. Especially, it is preferable to be transparent resins that can injection mold such as polycarbonate and acryl. It is possible to further decrease manufacturing cost of the design filter if the material can be formed by injection molding.

In addition, the condenser lens 211 is used in examples shown in FIGS. 2B etc., to increase efficiency of utilization of light emitted from the light source 11 in the projector 1. However, the light emitted from the light source 11 may be entered directly into the design plate 20 or the design filter 50 etc., without using the condenser lens 211. In addition, the light emitted from the light source 11 may be entered into the design plate 20 or the design filter 50 etc., after reflecting at a mirror.

Effects of Embodiments

In the projector 1 according to the above embodiment of the present invention, since the first lens part 21, the second lens part 22, and the design plate 20 are fixed with contacting each other, relative positioning accuracy of the condenser lens 211 included in the first lens part 21, the projection lens 221 included in the second lens part 22, and the design plate 20 is high. Thus, it is possible to control blurring the projection image caused by the relative position shift of the condenser lens 211, the projection lens 221, and the design plate 20. In addition, since the inside space between the first lens part 21 and the second lens part 22 is sealed, it is possible to control entering foreign objects such as dust around the design plate 20. Therefore, it is possible to control reflecting foreign object to the projection image.

In addition, according to the above embodiment of the present invention, it is possible to provide the projector projection design in the vehicle interior at low cost by using the design filters such as the design plate 20b and the design filter 50, which can be manufactured at lower cost than conventional products.

Although the embodiments of the invention have been described, the invention is not to be limited to the embodiments. The various kinds of modifications can be implemented without departing from the gist of the invention. In addition, the constituent elements in the embodiments and examples can be arbitrarily combined without departing from the gist of the invention.

In addition, the invention according to claims is not to be limited to the above embodiments and examples. Please note that all combinations of the features described in the embodiments are not necessary to solve the problem of the invention.

The invention claimed is:

1. A projector, comprising:
a light source to emit light;
a design plate comprising a design for projecting;
a first lens part comprising a condenser lens to condense light emitted from the light source and sends to the design plate; and
a second lens part comprising a projection lens to project the design of the design plate,
wherein the first lens part and the second lens part sandwich and fix the design plate to seal the design plate inside,
wherein the design of the design plate comprises a fine part whose fineness exceeds resolution of the projection lens and which is not resolvedly projected at a focused projection image, and
wherein a brightness between a brightness at a part formed by a light transmitting part of the design and a brightness at a part formed by a light blocking part of the design in the focused projection image is described by the fine part.

2. The projector according to claim 1, wherein the design plate further comprises a transparent substrate and an opacifying film on the transparent substrate comprising a pattern to form the design, and
wherein a minimum width of the opacifying film is less than 10 μm.

3. A projector, comprising
a light source to emit light;
a design filter comprising a transparent material comprising a design for projecting; and
a projection lens to magnify and project the design of the design filter,
wherein the design filter comprises a design formed surface, and
wherein the design formed surface comprises a first surface having an angle of not less than 75° and not more than 105° to a thickness direction of the design filter, and a second surface having an angle of not less than 30° and not more than 60° to the thickness direction of the design filter, the first and second surfaces being arranged corresponding to the design.

4. The projector according to claim 3, wherein the design formed surface of the design filter comprises a base plane comprising the first surface and at least one of a protrusion comprising the two second surfaces opposed to each other and a cavity comprising the two second surfaces opposed to each other.

5. The projector according to claim 3, wherein the design filter is plate-shaped and further comprises the design formed surfaces on both surfaces thereof.

6. The projector according to claim 3, wherein the design filter comprises a lens part serving as a condenser lens to condense light emitted from the light source on an opposite side of the design formed surface.

7. A design filter, comprising:
a plate-shaped transparent material comprising a design for projector projection; and
a design formed surface at both surfaces thereof,
wherein the design formed surface comprises a first surface having an angle of not less than 75° and not more than 105° to a thickness direction of the design filter, and a second surface having an angle of not less than 30° and not more than 60° to the thickness direction of the design filter, the first and second surfaces being arranged corresponding to the design.

8. A design filter, comprising:
a transparent material comprising a design for projector projection;
a design formed surface; and
a lens part serving as a condenser lens to condense light emitted from a light source of a projector on an opposite side of the design formed surface,
wherein the design formed surface comprises a first surface having an angle of not less than 75° and not more than 105° to a thickness direction of the design filter, and a second surface having an angle of not less than 30° and not more than 60° to the thickness direction of the design filter, the first and second surfaces being arranged corresponding to the design.

9. The projector according to claim 1, wherein
the first lens part, the second lens part, and the design plate are fixedly adhered to each other.

10. The projector according to claim 1, wherein
the first lens part, the second lens part, and the design plate are fixedly adhered to each other by a snap fit.

11. The projector according to claim 1, wherein
the first lens part, the second lens part, and the design plate are fixedly adhered to each other by adhesive bond.

12. The projector according to claim 1, wherein
a space inside the first lens part and the second lens part is sealed.

\* \* \* \* \*